(12) United States Patent
Lin

(10) Patent No.: US 7,443,533 B2
(45) Date of Patent: Oct. 28, 2008

(54) IMAGE COMPOSITION SYSTEMS AND METHODS

(75) Inventor: Tsung-Wei Lin, Taipei (TW)

(73) Assignee: Corel TW Corp., Taipei (TW)

( * ) Notice: Subject to any disclaimer, the term of this patent is extended or adjusted under 35 U.S.C. 154(b) by 673 days.

(21) Appl. No.: 11/179,548

(22) Filed: Jul. 13, 2005

(65) Prior Publication Data

US 2006/0061845 A1    Mar. 23, 2006

(30) Foreign Application Priority Data

Sep. 17, 2004    (TW) .............................. 93128391 A

(51) Int. Cl.
*G06K 1/00* (2006.01)
*G06F 15/00* (2006.01)
*H04N 1/00* (2006.01)
*H04N 1/46* (2006.01)

(52) U.S. Cl. ........................................ 358/1.6; 358/540

(58) Field of Classification Search ................. 358/1.9, 358/1.18, 1.6, 540; 348/230.1, 294
See application file for complete search history.

(56) References Cited

U.S. PATENT DOCUMENTS 7,312,824 B2 * 12/2007 Takano et al. ................ 348/294
7,382,403 B2 *  6/2008 Sakamoto ................. 348/230.1

FOREIGN PATENT DOCUMENTS

| JP | 11-185018 A | 7/1999 |
| JP | 2000-228747 A | 8/2000 |
| JP | 2000-307921 A | 11/2000 |
| JP | 2002-044510 A | 2/2002 |
| JP | 2003-46857 A | 2/2003 |
| JP | 2004-48445 A | 2/2004 |

* cited by examiner

*Primary Examiner*—Douglas Q Tran
(74) *Attorney, Agent, or Firm*—Birch, Stewart, Kolasch & Birch, LLP

(57) ABSTRACT

An image composition system. The image composition system comprises an image detection unit and an image composition unit. The image detection unit detects marked parts in low dynamic range images. The low dynamic range images are images of the same scene taken at different exposure levels. The image composition unit sets exposure history data of the low dynamic range images according to the marked parts. The image composition unit then synthesizes the low dynamic range images into a high dynamic range image according to the exposure history data.

16 Claims, 4 Drawing Sheets

IMAGE COMPOSITION SYSTEMS AND METHODS

BACKGROUND

The invention relates to image composition methods, and in particular to composition methods for displaying high dynamic range images on standard low dynamic range device.

Image reproduction is an important issue for artists in various Ages, such as painters or photographers. One goal of image reproduction is to reproduce original images based on image factors, such as brightness, colors, or figures. For image reproduction, low dynamic range (LDR) images are easy to reproduce, while high dynamic range (HDR) images are difficult.

The dynamic range of a scene is defined by the contrast ratio between its brightest and darkest parts. A high dynamic range image (HDR image) is typically generated by combining multiple LDR images of the same scene taken at different exposure levels. For example, a flat plate in a luminous room may compose a LDR image, while a black dog in white snow forms a HDR image.

Generally, painters can reproduce images properly through painting techniques even if the contrast ratio of an image is large. For traditional photographers, because of limitations of camera mechanism, the only recourse is to wait for a suitable time and scene for capturing images.

Recently, cameras have been digitized. Thus, the images taken by digital cameras are digital images. Digital photographers can post-process digital images via digital image processing methods to reproduce original images properly. Thus, HDR images can be composed and processed by some image processing tools to obtain a displayable low dynamic range image. However, present image composition tools cannot produce a satisfactory HDR image, especially eliminating the motion defect of the image, such as waterfalls, moving people, etc. Thus, more effective HDR image processing methods for image composition are desirable.

SUMMARY

An exemplary embodiment of an image composition system is provided comprising an image detection unit and an image composition unit. The image detection unit detects marked parts in low dynamic range images. The low dynamic range images are images of the same scene taken at different exposure levels. The image composition unit sets exposure history data of the low dynamic range images according to the marked parts. The image composition unit then synthesizes the low dynamic range images into a high dynamic range image according to the exposure history data.

DESCRIPTION OF THE DRAWINGS

The invention can be more fully understood by reading the subsequent detailed description and examples with references made to the accompanying drawings, wherein.

DESCRIPTION

Figure 1:
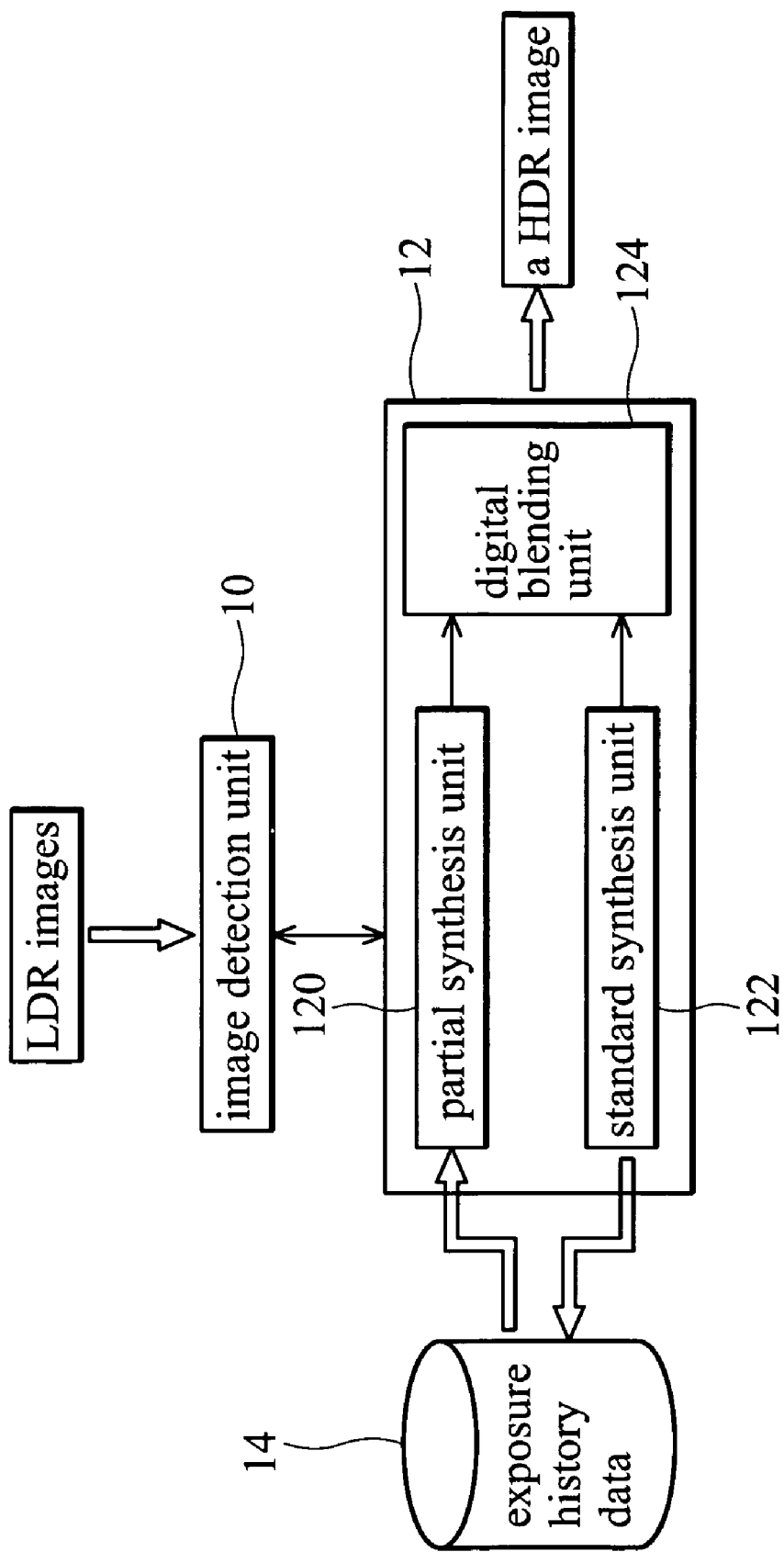
FIG. 1 is a diagram of an embodiment of an image composition system.

FIG. 1 is a diagram of an embodiment of an image composition system. The system includes an image detection unit 10 and an image composition unit 12. Low dynamic range images are first provided. The low dynamic range images are images of the same scene taken at different exposure levels. The different images may be produced by capturing at different exposure settings at the same time.

The image detection unit 10 detects marked parts in low dynamic range images. The marked parts comprise deletion parts which are dropped without composing, and/or reservation parts which must be referred by other LDR images. The deletion and reservation parts can be marked in the same or different low dynamic range images.

The image composition unit 12 is coupled to the image detection unit 10. The image composition unit 12 sets exposure history data of the low dynamic range images according to the unmarked parts and composes the low dynamic range images into a high dynamic range image according to the exposure history data. Here, the exposure history data can be stored in a database 14.

When the image composition unit 12 synthesizes the images, the low dynamic range images are divided into marked area and unmarked area according to each marked part. The image composition unit 12 maps each reservation part to the corresponding area of the rest images, deletes the deletion parts in the marked images, and then synthesizes the marked images and unmarked images.

For example, if low dynamic range images are images A, B, and C, and a deletion part is marked in image A, image A is a marked image for this deletion part and images B and C are unmarked images for this deletion part. If image B comprises a reservation part, image B is a marked image for this reservation part and images A and C are unmarked images for this reservation part.

The image composition unit 12 further comprises a partial composition unit 120, a standard composition unit 122, and a digital blending unit 124. The partial composition unit 120 synthesizes the marked parts, sets the exposure history data of the low dynamic range images accordingly, and obtains partial synthesized images according to the exposure history data. The standard composition unit 122 synthesizes unmarked parts of the low dynamic range images to obtain standard synthesized images. The digital blending unit 124, coupled to the partial composition unit 120 and the standard composition unit 122, digitally blends the partial synthesized images and the standard synthesized images into a high dynamic range image.

If the partial composition unit 120 or the standard composition unit 122 cannot synthesize images according to the exposure history data 14, a response function is adopted for image composition. The response function is calculated by:

$$\ln E_1 = \frac{\sum_{j=1}^{M}(g(L_{ij}) - \ln \Delta t_j)}{M} \cong \frac{\sum_{k=1}^{x, x<M}(g(L_{ik}) - \ln \Delta t_k)}{x} \cong g(L_{ij}) - \ln \Delta t_j$$

E is a theoretical brightness value, g is the response function, L is a pixel value, $\Delta t$ is exposure time, i is pixel number, j and k are exposure times, and M and X are the numbers of the low dynamic range images.

Here, M is a maximum number of the low dynamic range images, for example, M=5. All the 5 images can be used for theoretical brightness value calculation. In some situations, only parts of the 5 images are used for calculation, for example, 3 or 4 images. The rightmost side of the response function represents that the brightness value can be calculated using even 1 image. Moreover, g is a camera response function, produced by a regression analysis method.

Figure 2A:
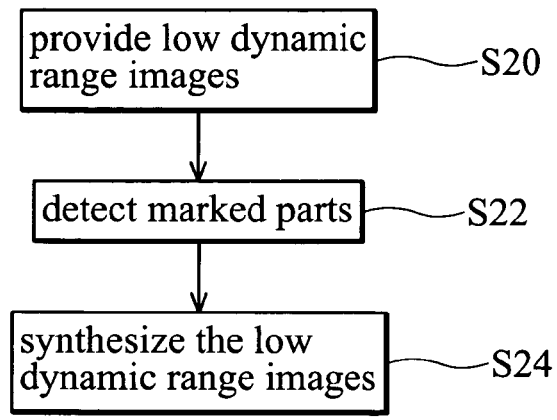
FIG. 2a is a flowchart of an embodiment of an image composition method.

FIG. 2a is a flowchart of an embodiment of an image composition method. Low dynamic range images are provided (step S20). The low dynamic range images are images of the same scene taken in different exposure levels. Marked parts in the low dynamic range images are then detected (step S22). Exposure history data of the low dynamic range images is set according to the marked parts. The low dynamic range images are synthesized into a high dynamic range image according to the exposure history data (step S24). The exposure history data can be stored in a database.

The marked parts may comprise deletion parts and/or reservation parts. The deletion parts and the reservation parts can be marked in the same or different low dynamic range images.

Figure 2B:
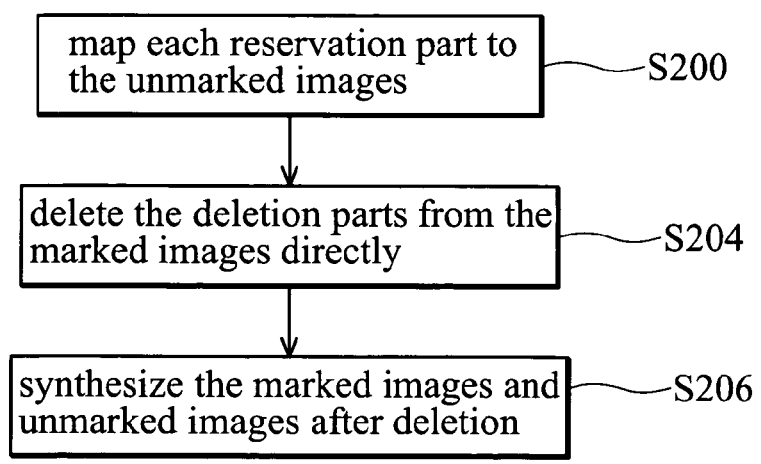
FIG. 2b is a detailed flowchart of image composition of the embodiment of an image composition method.

FIG. 2b is a detailed flowchart of image composition of the embodiment of an image composition method. The low dynamic range images are divided into a marked image and unmarked images according to each marked part. For image composition, each reservation part is mapped to the unmarked images (step S200). The mapped reservation parts may be deleted from the unmarked images. The deletion parts are deleted from the marked images directly (step S204). The marked images and unmarked images are synthesized after deletion (step S206).

In the step S20, image composition is accomplished by the following steps. The marked parts of the low dynamic range images are synthesized. The exposure history data of the low dynamic range images is set. Partial synthesized images are obtained according to the exposure history data. Unmarked parts of the low dynamic range images are synthesized to obtain standard synthesized images. The partial synthesized images and the standard synthesized images are digitally blended into the high dynamic range image.

If the images cannot be synthesized according to the exposure history data, a response function is referred for image composition. The response function is calculated by:

$$\ln E_1 = \frac{\sum_{j=1}^{M}(g(L_{ij}) - \ln\Delta t_j)}{M} \cong \frac{\sum_{k=1}^{x, x<M}(g(L_{ik}) - \ln\Delta t_k)}{x} \cong g(L_{ij}) - \ln\Delta t_j$$

Here, E is a theoretical brightness value, g is the response function, L is a pixel value, $\Delta t$ is exposure time, i is pixel number, j and k are exposure times, and M and X are the numbers of the low dynamic range images.

Figure 3:
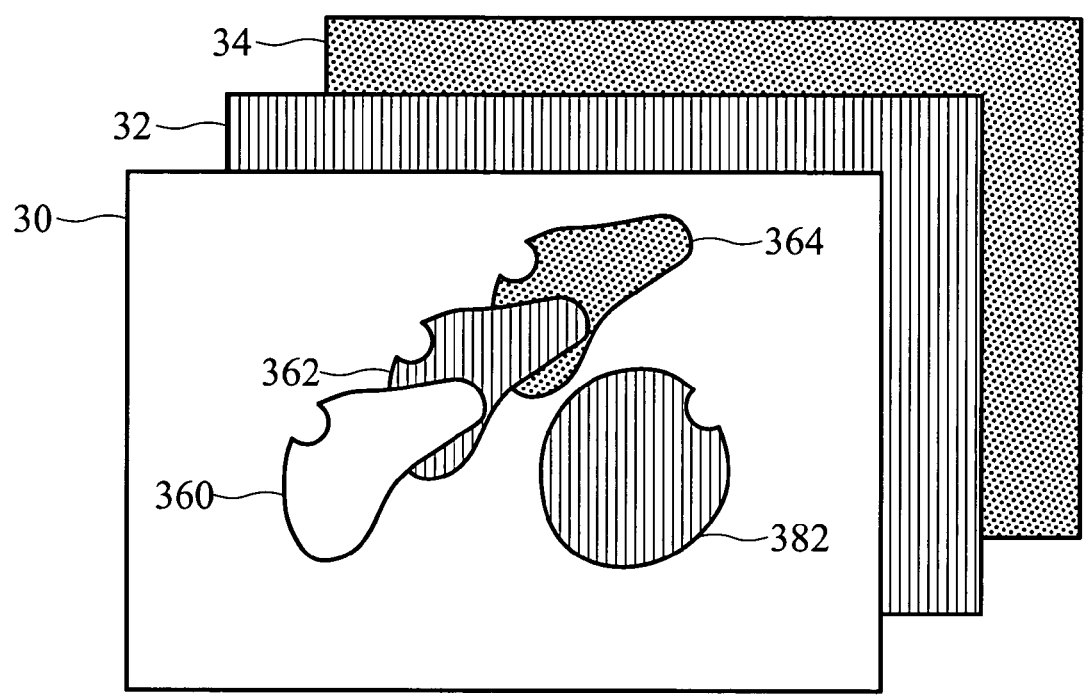
FIG. 3 is a diagram of an exemplary embodiment of an image composition method.

FIG. 3 is a diagram of an exemplary embodiment of an image composition method. In this exemplary embodiment, 3 low dynamic range images are provided, i.e. images 30, 32, and 34. These 3 low dynamic range images are images of the same scene taken at different exposure levels. Users can mark the images on a user interface or other display using marking tools, such as a mouse. The marked parts may be deletion or reservation parts.

A reservation part 360 is marked in image 30 and a deletion part 382 is marked in image 30. Here, the deletion and reservation parts can be marked in the same or different images. Thereafter, the reservation part 360 is mapped to the same position of the rest of images 32 and 34, shown as marked parts 362 and 364. When the images are synthesized, the original data of mapped parts 362 and 364 are replaced by part 360. Only the reservation part 360 will be reserved. The deletion part 382 is deleted directly. The 3 images 30, 32, and 34 are synthesized to a high dynamic range image after deletion.

Figure 4:
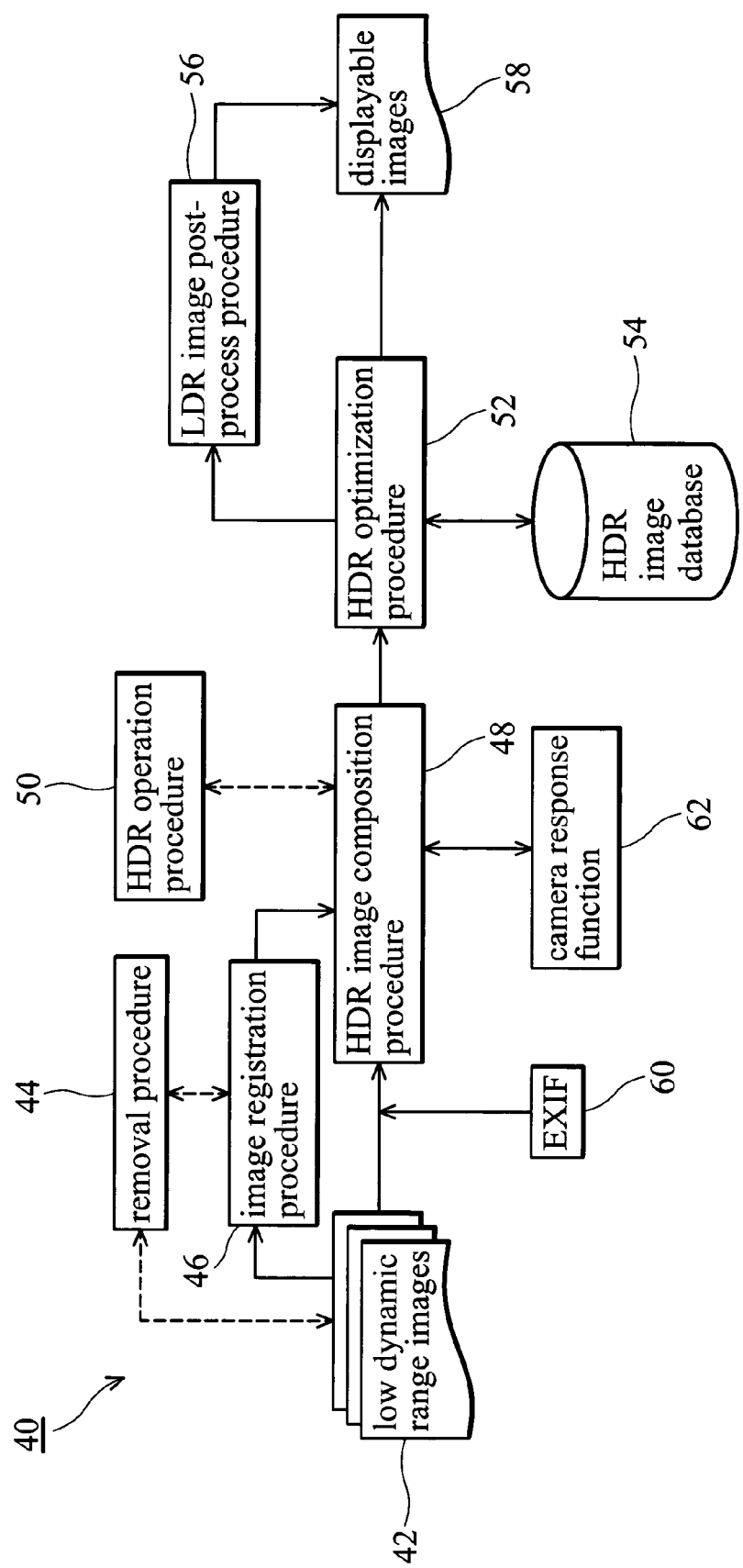
FIG. 4 is a diagram of another exemplary embodiment of an image composition method.

FIG. 4 is a diagram of another exemplary embodiment of an image composition method. This exemplary embodiment is related to HDR image processing methods, for example, U.S. application Ser. No. 10/834881 discloses a method of HDR image processing and manipulation. In this exemplary embodiment, the provided image composition method is applied to an image processing system 40. Low dynamic range images 42 are provided. The provided low dynamic range images 42 can be exchangeable image file format (EXIF) 60. The provided images are first processed by a removal procedure 44. If the images are not to be processed by the removal procedure 44, the images are sent to image registration procedure 46.

Thereafter, the images are processed by a HDR image composition procedure 48. The function of the HDR image composition procedure 48 is to synthesize images through numerical analysis. The HDR image composition procedure 48 may refer to a camera response function 62 and a HDR operation procedure 50. The provided image composition method is employed in the removal procedure 44 and the HDR operation procedure 50.

The images are then processed by a HDR optimization procedure 52. The main function of the HDR optimization procedure 52 is image selection. The HDR optimization procedure 52 may refer to a HDR image database 54. Next, the images are processed by a LDR image post-process procedure 56 to obtain displayable images 58.

Thus, the provided image composition methods and systems may potentially resolve conventional image reproduction problems, reducing manual operations.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image composition system, comprising:
   an image detection unit, detecting at least one marked part in at least one low dynamic range image, wherein the low dynamic range images are images of the same scene taken in different exposure levels; and
   an image composition unit, coupled to the image detection unit, setting exposure history data of the low dynamic range images according to the marked parts, and synthesizing the low dynamic range images into a high dynamic range image according to the exposure history data.

2. The image composition system as claimed in claim 1, wherein the exposure history data is stored in a database.

3. The image composition system as claimed in claim 1, wherein the marked parts comprise at least one deletion part and/or at least one reservation part.

4. The image composition system as claimed in claim 3, wherein the deletion and the reservation parts are marked in the different low dynamic range images.

5. The image composition system as claimed in claim 3, wherein the deletion and the reservation parts are marked in the same low dynamic range images.

6. The image composition system as claimed in claim 3, wherein the low dynamic range images are divided into a marked image and at least one unmarked image according to each marked part, and the image composition unit further:
   maps each reservation part to the corresponding areas of the unmarked images;
   deletes the deletion parts from the marked images; and
   synthesizes the marked images and unmarked images after deletion.

7. The image composition system as claimed in claim 1, wherein the image composition unit further comprises:
   a partial composition unit, coupled to the image detection unit, synthesizing the marked parts, setting the exposure history data of the low dynamic range images according to the marked parts, and obtaining at least one partial synthesized image according to the exposure history data;
   a standard composition unit, coupled to the image detection unit, synthesizing unmarked parts of the low dynamic range images to obtain at least one standard synthesized image; and
   a digital blending unit, coupled to the partial composition unit and the standard composition unit, digitally blending the partial synthesized images and the standard synthesized images into the high dynamic range image.

8. The image composition system as claimed in claim 7, wherein if the partial composition unit or the standard composition unit cannot synthesize images according to the exposure history data, a response function is referred for image composition, wherein the response function is calculated by:

$$\ln E_1 = \frac{\sum_{j=1}^{M}(g(L_{ij}) - \ln \Delta t_j)}{M} \cong \frac{\sum_{k=1}^{x, x<M}(g(L_{ik}) - \ln \Delta t_k)}{x} \cong g(L_{ij}) - \ln \Delta t_j$$

wherein E is a theoretical brightness value, g is the response function, L is a pixel value, $\Delta t$ is exposure time, i is pixel number, j and k are exposure times, and M and X are the numbers of the low dynamic range images.

9. An image composition method, comprising:
   providing at least one low dynamic range image, wherein the low dynamic range images are images of the same scene taken in different exposure levels;
   detecting at least one marked part in the low dynamic range images;
   setting exposure history data of the low dynamic range images according to the marked parts; and
   synthesizing the low dynamic range images into a high dynamic range image according to the exposure history data.

10. The image composition method as claimed in claim 9, wherein the exposure history data is stored in a database.

11. The image composition method as claimed in claim 9, wherein the marked parts comprise at least one deletion part and/or at least one reservation part.

12. The image composition method as claimed in claim 11, wherein the deletion part and the reservation part are marked in the different low dynamic range images.

13. The image composition method as claimed in claim 11, wherein the deletion part and the reservation part are marked in the same low dynamic range images.

14. The image composition method as claimed in claim 11, wherein the low dynamic range images are divided into a marked image and at least one unmarked image according to each marked part, the composition further comprising:
   mapping each reservation part to the corresponding areas of the unmarked images;
   deleting the deletion parts from the marked images; and
   synthesizing the marked images and unmarked images after deletion.

15. The image composition method as claimed in claim 9, wherein the composition further comprises:
   synthesizing the marked parts of the low dynamic range images and setting the exposure history data of the low dynamic range images;
   obtaining at least one partial synthesized image according to the exposure history data;
   synthesizing unmarked parts of the low dynamic range images to obtain at least one standard synthesized image; and
   blending digitally the partial synthesized images and the standard synthesized images into the high dynamic range image.

16. The image composition method as claimed in claim 15, wherein if the images cannot be synthesized according to the exposure history data, a response function is referred for image composition, wherein the response function is calculated by:

$$\ln E_1 = \frac{\sum_{j=1}^{M}(g(L_{ij}) - \ln \Delta t_j)}{M} \cong \frac{\sum_{k=1}^{x, x<M}(g(L_{ik}) - \ln \Delta t_k)}{x} \cong g(L_{ij}) - \ln \Delta t_j$$

wherein E is a theoretical brightness value, g is the response function, L is a pixel value, $\Delta t$ is exposure time, i is pixel number, j and k are exposure times, and M and X are the numbers of the low dynamic range images.

* * * * *